Figure 1:
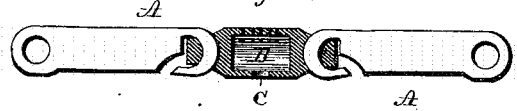
Figure 2:
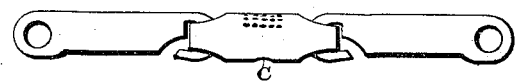

La F. HARTSON & J. W. BRONSON.
Bridle-Bit.

No. 164,554.                                Patented June 15, 1875.

WITNESSES.                           INVENTOR.
   J. W. Garner                         LaFayette Hartson
   C. W. Lemon                          Jas. W. Bronson
                                          per
                                        F. A. Lehmann, Atty.

UNITED STATES PATENT OFFICE.

LA FAYETTE HARTSON AND JAMES W. BRONSON, OF WYOMING, IOWA.

IMPROVEMENT IN BRIDLE-BITS.

Specification forming part of Letters Patent No. 164,554, dated June 15, 1875; application filed May 15, 1875.

*To all whom it may concern:*

Be it known that we, LA FAYETTE HARTSON and JAMES W. BRONSON, of Wyoming, in the county of Jones and State of Iowa, have invented certain new and useful Improvements in Bridle-Bits; and we do hereby declare the following to be a full, clear, and exact description of the invention, such as will enable others skilled in the art to which it pertains to make and use it, reference being had to the accompanying drawings, which form part of this specification.

Our invention relates to an improvement in bridle-bits, having a chamber or receptacle for medicine as a preventive from contagious diseases, as will be more fully described hereafter.

The accompanying drawing represents our invention.

A represents a bridle-bit for horses, composed of three pieces, the center-piece being hooked or otherwise jointed to the outside parts. The whole center-piece is made hollow to form a chamber, B, of sufficient capacity to hold an ordinary dose of medicine for a horse. An opening, C, of suitable size, is left for the introduction of medicine, which opening may be closed, when necessary, by a cork or otherwise. At the under side of the chamber B, in the part which touches the horse's tongue, a number of small holes are made to communicate with the chamber, and through them the drug, when moistened by the saliva of the horse, gradually oozes into the mouth.

In this manner medicine may easily be administered to horses without resorting to forcible means.

During epidemics asafetida or other preventives may be constantly kept, without any trouble, in the horse's mouth when bitted and at work, to keep away disease.

Having thus described our invention, we claim—

A bridle-bit consisting of the hollow center-piece, provided with perforations and opening C, in connection with the hooked end pieces, all constructed and arranged as herein shown and set forth.

In testimony that we claim the foregoing we have hereunto set our hands this 7th day of May, 1875.

LA FAYETTE HARTSON.
  JAMES W. BRONSON.

Witnesses:
  REUBEN WAITE,
  JOHN C. NICHOLS.